(12) United States Patent
Yang et al.

(10) Patent No.: US 7,430,013 B2
(45) Date of Patent: Sep. 30, 2008

(54) CAMERA ASSEMBLY FOR A MOBILE COMMUNICATION DEVICE

(75) Inventors: Kyung-Tae Yang, Seoul (KR); Min-Soo Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 687 days.

(21) Appl. No.: 10/826,724

(22) Filed: Apr. 16, 2004

(65) Prior Publication Data

US 2005/0013606 A1    Jan. 20, 2005

(30) Foreign Application Priority Data

Apr. 16, 2003   (KR) ...................... 10-2003-0024066

(51) Int. Cl.
*H04N 5/225* (2006.01)
*H04M 1/00* (2006.01)

(52) U.S. Cl. ..................................... 348/376; 455/556.1

(58) Field of Classification Search ......... 348/373–376; 455/556.1, 556.2, 557, 575.3
See application file for complete search history.

(56) References Cited

U.S. PATENT DOCUMENTS

| | | | |
|---|---|---|---|
| 5,465,144 A | 11/1995 | Parker | |
| 6,704,586 B2 * | 3/2004 | Park | 455/575.3 |
| 6,785,935 B2 * | 9/2004 | Ahn et al. | 16/221 |
| 6,876,379 B1 * | 4/2005 | Fisher | 348/14.02 |
| 7,133,691 B2 * | 11/2006 | Kang | 455/556.1 |
| 7,146,200 B2 * | 12/2006 | Park et al. | 455/575.3 |
| 7,184,092 B2 * | 2/2007 | Lim | 348/376 |
| 2001/0036845 A1 | 11/2001 | Park | 455/566 |
| 2003/0227546 A1 * | 12/2003 | Hilborn et al. | 348/148 |

FOREIGN PATENT DOCUMENTS

| | | |
|---|---|---|
| CN | 1391420 A | 1/2003 |
| EP | 1 267 576 A2 | 12/2002 |
| JP | 7-167225 | 7/1995 |
| JP | 2001-216049 | 8/2001 |
| JP | 2001-298516 | 10/2001 |
| JP | 2002-044208 | 2/2002 |
| JP | 2002-223275 | 8/2002 |
| JP | 2003-037375 | 2/2003 |
| JP | 2004-194267 | 7/2004 |
| KR | 2003078230 | * 3/2002 |

* cited by examiner

*Primary Examiner*—Justin P Misleh
(74) *Attorney, Agent, or Firm*—Lee, Hong, Degerman, Kang & Schmadeka

(57) ABSTRACT

A camera assembly for a mobile communication device comprises a camera, and a first portion adapted to rotate the camera. The first portion comprises a housing, a gear motor mounted in the housing for generating a rotational force, and a decelerator adapted to decelerate the rotational force for the purpose of rotating the camera.

16 Claims, 9 Drawing Sheets

CAMERA ASSEMBLY FOR A MOBILE COMMUNICATION DEVICE

CROSS-REFERENCE TO RELATED APPLICATIONS

Pursuant to 35 U.S.C. § 119(a), this application claims the benefit of earlier filing date and right of priority to Korean Patent Application No. 10-2003-0024066, filed on Apr. 16, 2003, the contents of which is hereby incorporated by reference in its entirety.

BACKGROUND OF THE INVENTION

1. Field of the Invention

The present invention relates generally to mobile communication devices and more particularly to a camera assembly for a mobile communication device.

2. Description of the Related Art

Mobile communication devices may be classified according to camera mounting position, such as, for example, a body mounted type, a foldable cover mounted type, or a hinge mounted type. The latter type allows a relatively wide camera-viewing angle. The term "mobile communication devices" may comprise mobile telephones, cellular telephones, personal communication systems (PCS), personal data assistants (PDA), laptop computers, and any other devices capable of wireless communication.

As schematically shown in FIGS. 1-2, a conventional mobile communication device 8 comprises a body 10 including keypad 12, a foldable cover 20 rotatably coupled to body 10 via a hinge 30, and a camera assembly 40 coupled to hinge 30. Hinge 30 includes first and second hinge portions 31 and 33 operatively coupled to body 10, and third hinge portion 32 operatively coupled to foldable cover 20 and disposed between first and second hinge portions 31, 33.

Camera assembly 40 is rotatably coupled to second hinge portion 33. Camera assembly 40 may be rotated within a certain angular range. The user manually rotates camera assembly 40 toward a desired direction which generally is not an easy task as mobile communication devices and camera assembles grow smaller in size every day. Also, it is not easy trying to manually adjust the viewing angle of camera assembly 40, while holding the mobile communication device and rotating camera assembly 40 at the same time with one hand.

SUMMARY OF THE INVENTION

In accordance with one aspect of the present invention, a camera assembly for a mobile communication device comprises a camera and a first portion adapted to rotate the camera. The first portion comprises a housing, a gear motor mounted in the housing for generating a rotational force, and means for decelerating the rotational force for the purpose of rotating the camera.

These and other aspects of the present invention will become apparent from a review of the accompanying drawings and the following detailed description of the present invention.

BRIEF DESCRIPTION OF THE DRAWINGS

The present invention is generally shown by way of reference to the accompanying drawings as follows.

DETAILED DESCRIPTION OF THE PREFERRED EMBODIMENTS

Some embodiments of the present invention will be described in detail with reference to the related drawings of FIGS. 1-17. Additional embodiments, features and/or advantages of the invention will become apparent from the ensuing description or may be learned by practicing the invention.

In the figures, the drawings are not to scale with like numerals referring to like features throughout both the drawings and the description.

The following description includes the best mode presently contemplated for carrying out the invention. This description is not to be taken in a limiting sense, but is made merely for the purpose of describing the general principles of the invention.

Figure 1:
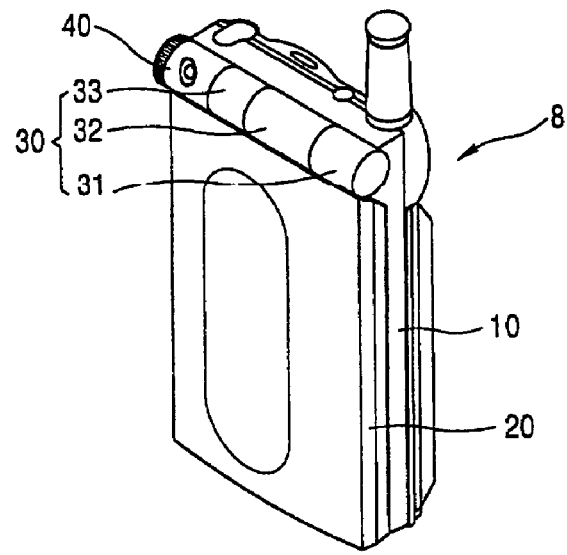
FIG. 1 schematically illustrates a conventional mobile communication device having a hinge-mounted camera assembly and a foldable cover in a closed state.
Figure 2:
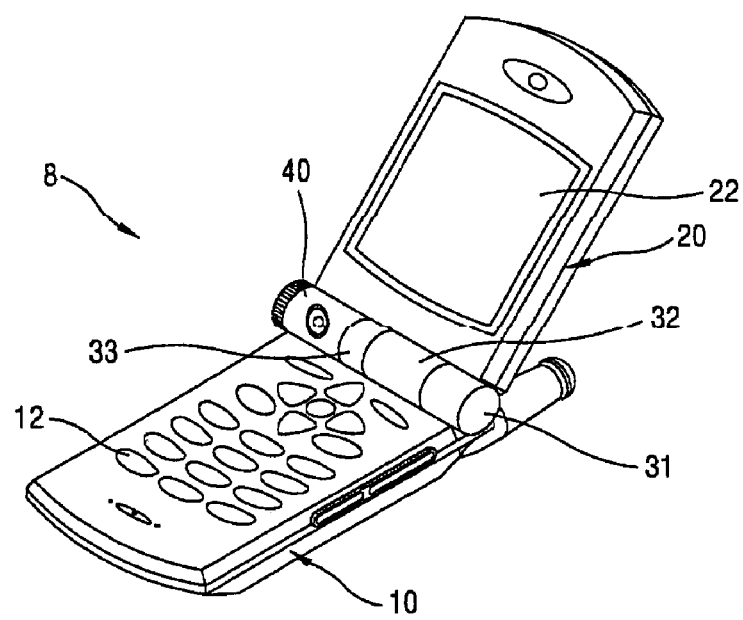
FIG. 2 schematically illustrates a conventional mobile communication device having a hinge-mounted camera assembly and a foldable cover in an open state.
Figure 3:
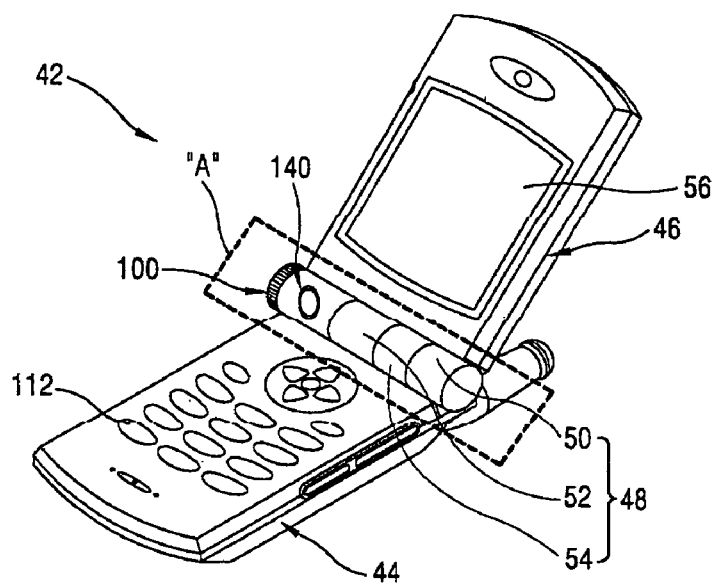
FIG. 3 schematically illustrates a mobile communication device having a hinge-mounted camera assembly and a foldable cover in an open state in accordance with the present invention.

FIG. 3 schematically illustrates a mobile communication device (MCD) 42 in accordance with a preferred embodiment of the present invention. MCD 42 generally comprises a body 44 and a foldable cover 46 rotatably coupled to body 44 via a hinge 48. Hinge 48 includes first and second hinge portions 50, 54 coupled to body 44, and a third hinge portion 52 coupled to foldable cover 46 and disposed between first and second hinge portions 50, 54. MCD is equipped with an integral camera assembly 100 that is rotatably coupled to second hinge portion 52.

Figure 4:
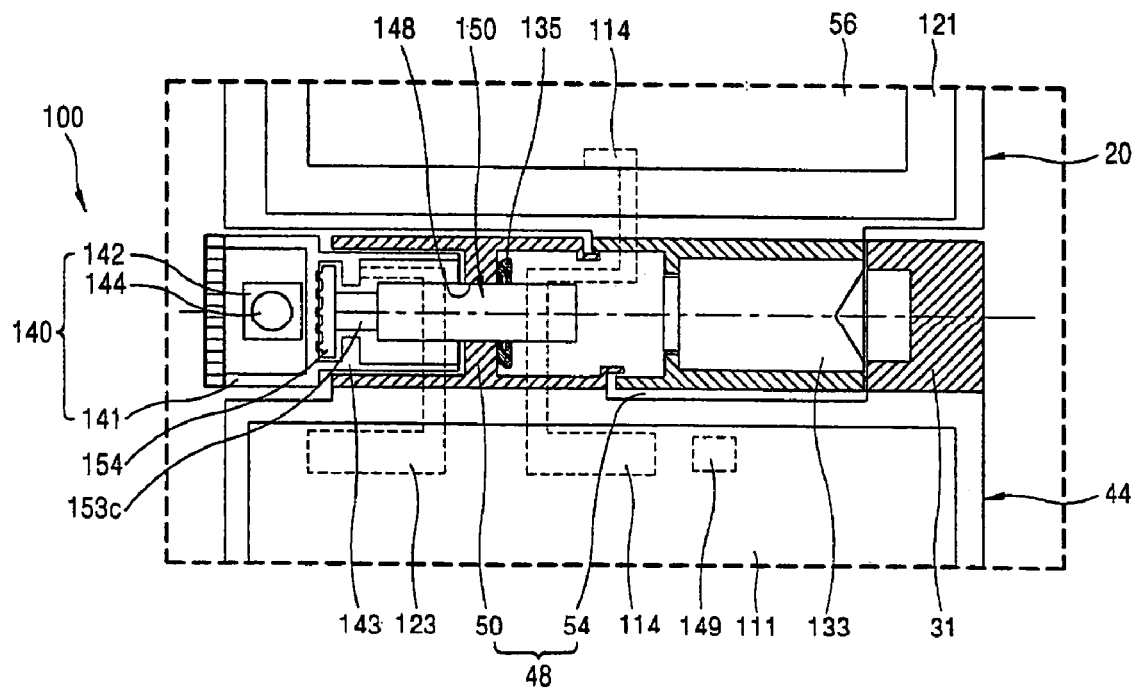
FIG. 4 is a cross-sectional view of an exemplary hinge-mounted camera assembly in accordance with one embodiment of the present invention.

As schematically shown in FIG. 4, body 44 includes a main printed circuit board (MPCB) 111 adapted to receive, store and transmit image information captured by a camera 140 of camera assembly 100, and a keypad 112 operatively coupled to MPCB 111. Body 44 also includes a flexible printed circuit board (FPCB) 123, which has one end coupled to MPCB 111 within body 44 and another end coupled to a camera module 142. When camera assembly 100 is rotated, FPCB 123 is wound in first and second hinge portions 50, 52 at least one time in order not to be cut.

Foldable cover 46 includes a liquid crystal display (LCD) 56, which displays images captured by camera 140, a PCB 121 operatively coupled to LCD 56, and a FPCB 114 operatively coupled between LCD 56, PCB 121 and MPCB 11.

Camera assembly 100 includes camera 140 which is rotatably coupled to hinge 48, a rotatable portion 150 installed at a lateral surface of camera 140 and adapted to allow rotation of camera 140, and a controller 149 adapted to control the operation of rotatable portion 150. Camera 140 includes a generally cylindrical camera case 141 rotatably installed at one side of second hinge portion 52, and a camera module 142 mounted in camera case 141 and having a photographic lens 144. One side of camera 140 is adapted to accommodate FPCB 123 while it is being wound.

Figure 5:
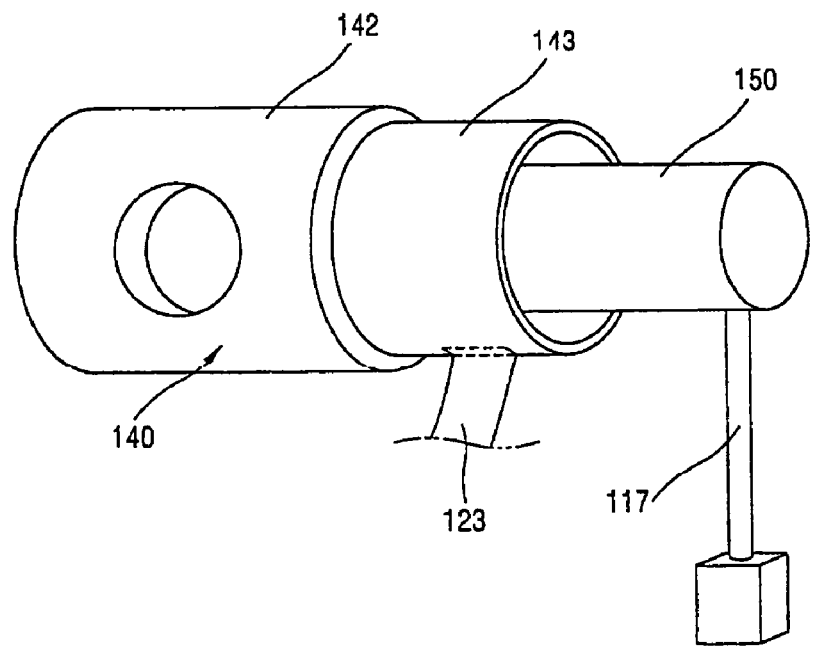
FIG. 5 is a partial perspective view of the camera assembly of FIG. 4.
Figure 6:
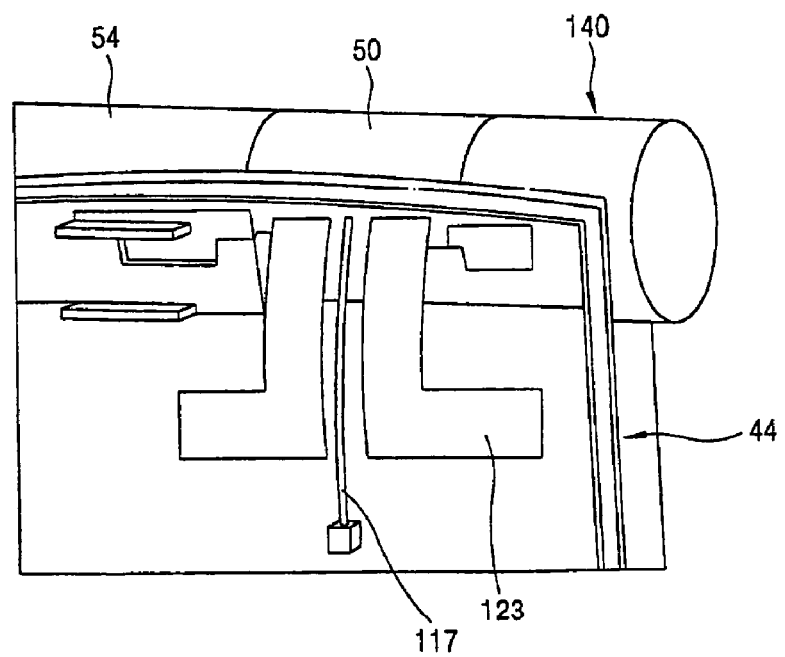
FIG. 6 is another partial perspective view of the camera assembly of FIG. 4.
Figure 9:
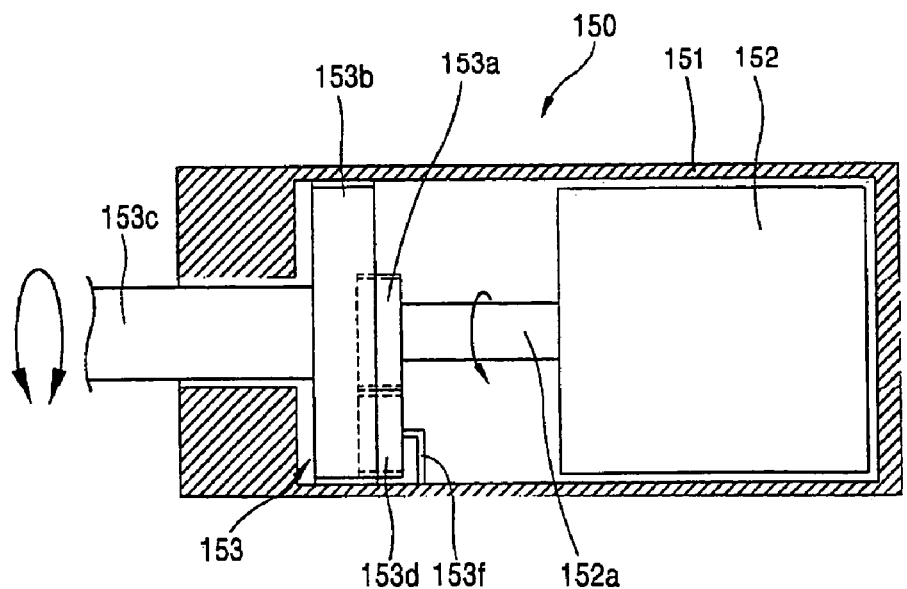
FIG. 9 is a partial plan view of a rotatable camera portion in accordance with the present invention.

Rotatable portion 150 is inserted into a hinge groove 148 formed generally in the middle of first and second hinge portions 50, 52 and fixed by a fixation ring 135. Rotatable portion 150 is provided with a power connector (FIG. 5). As schematically shown in FIG. 9, rotatable portion 150 comprises a housing 151, a gear motor 152 installed in housing 151 and adapted to generate a rotational force according to an electrical control signal from controller 149 (FIG. 4), and a decelerator 153 coaxially disposed with gear motor 152. Decelerator 153 is adapted to decelerate the rotational force generated by gear motor 152. Decelerator 153 is operatively coupled to camera 140, as generally shown in FIG. 4.

Figure 10:
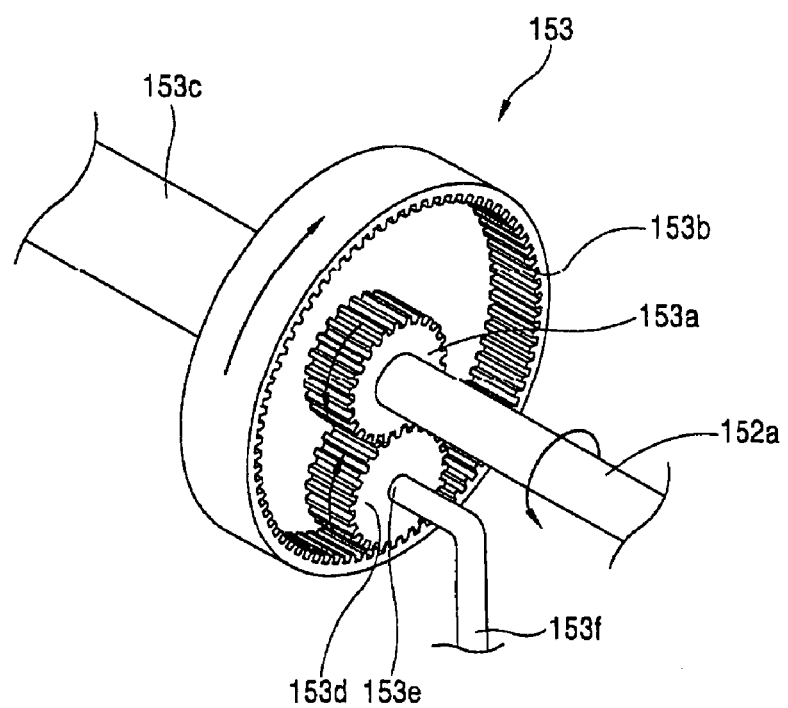
FIG. 10 is a perspective view of an exemplary decelerator for use in accordance with the present invention.

As generally depicted in FIG. 10, decelerator 153 comprises drive gear 153a coupled to motor axle 152a, deceleration gear 153b adapted to mesh with drive gear 153a and deceleration-rotated with a certain ratio, a deceleration rotational axle 153c for transmitting a rotational force which has been decelerated by deceleration gear 153b to camera 140, and a transmission gear 153d adapted to mesh With drive gear 153a and deceleration gear 153b. Transmission gear 153d is mounted on a bracket 153f, and rotates via axle 153e. The rotational force generated by gear motor 152 is transmitted through drive gear 153a, transmission gear 153d, and deceleration gear 153b sequentially and is outputted via deceleration rotational axle 153c.

Figure 7:
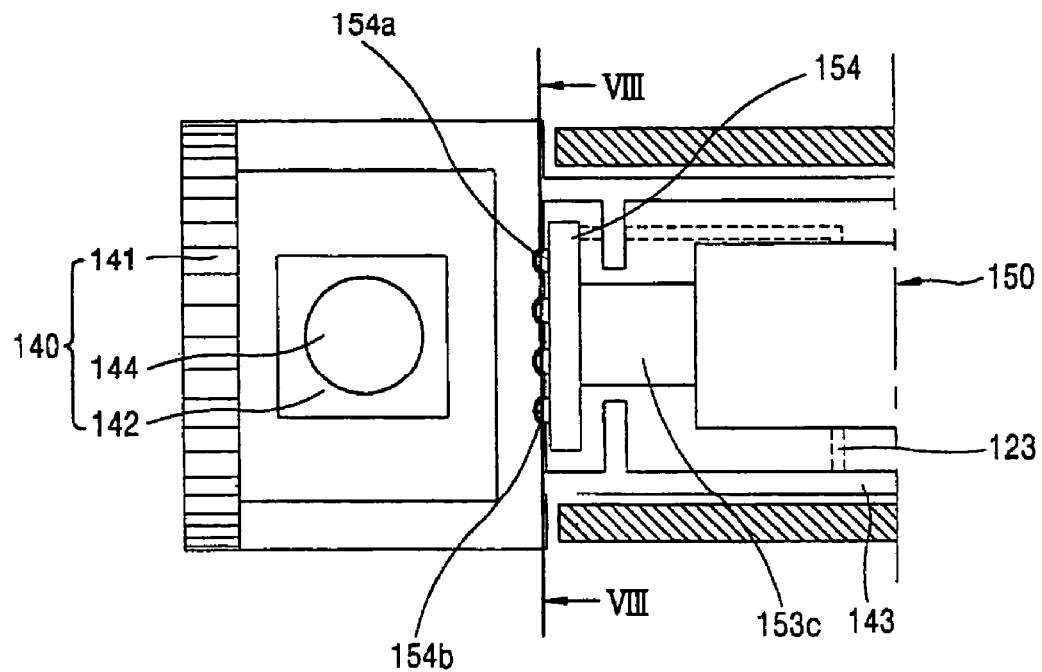
FIG. 7 is yet another partial perspective view of the camera assembly of FIG. 4.
Figure 8:
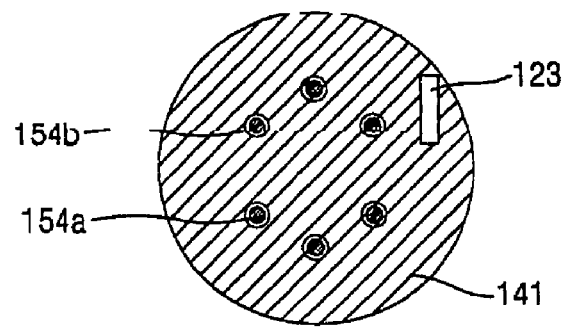
FIG. 8 is a cross-sectional view taken along section line VIII-VIII of FIG. 7.

As schematically shown in FIG. 7, a frictional plate 154 having a plurality of stepped protrusions 154a is formed at the end of deceleration rotational axle 153c. A plurality of mating grooves 154b corresponding to the stepped protrusions 154a are formed, respectively, at camera case 141 of camera 140. Stepped protrusions 154a and corresponding mating grooves 154b are, respectively, hemispherically shaped.

When the rotational angle of camera 140 is automatically controlled, deceleration rotational axle 153c causes camera 140 to rotate as stepped protrusions 154a are being fitted into mating grooves 154b. In this case, power is supplied to gear motor 152 via power connector 117 (FIG. 5) causing motor axle 152a to rotate. The user selects automatic camera rotational control via keypad 112.

When the rotational angle of camera 140 is manually controlled by the user, camera 140 is rotated towards a desired direction by the user with gear motor 152 of rotatable portion 150 being turned off. In this case, stepped protrusions 154a become consecutively fitted into adjacent mating grooves 154b thereby generating a frictional force. Deceleration rotational axle 153c elastically retreats in a backward direction. If camera 140 is stopped after being rotated within a certain angular range, stepped protrusions 154a stay engaged into mating grooves 154b to maintain the rotational angle of camera 140 desired by the user.

The rotational force of gear motor 152 is transmitted through drive gear 153a of decelerator 153, transmission gear 153d, deceleration gear 153b via motor axle 152a, and deceleration rotational axle 153c with a decelerated state as a certain ratio. Deceleration rotational axle 153c is rotated by frictional plate 154 by way of stepped protrusions 154a being engaged in corresponding mating grooves 154b, thereby automatically controlling the rotational angle of camera 140.

When the rotational angle of camera 140 is manually controlled, camera 140 is rotated toward a desired direction by the user with gear motor 152 of rotatable portion 150 being in a power-off state. In this case, stepped protrusions 154a consecutively engage into/disengage from adjacent mating grooves 154b generating a frictional force. Since gear motor 152 maintains its power-off state, deceleration rotational axle 153c and frictional plate 154 are stopped without rotation. The user hears a clicking sound, i.e. the user can touch feel that camera 140 is being rotated in a stepwise manner. If the user refrains from rotating camera 140, stepped protrusions 154a remain engaged into mating grooves 154b, i.e. the current rotational angle of camera 140 is maintained avoiding the possibility of being arbitrarily changed.

Figure 11:
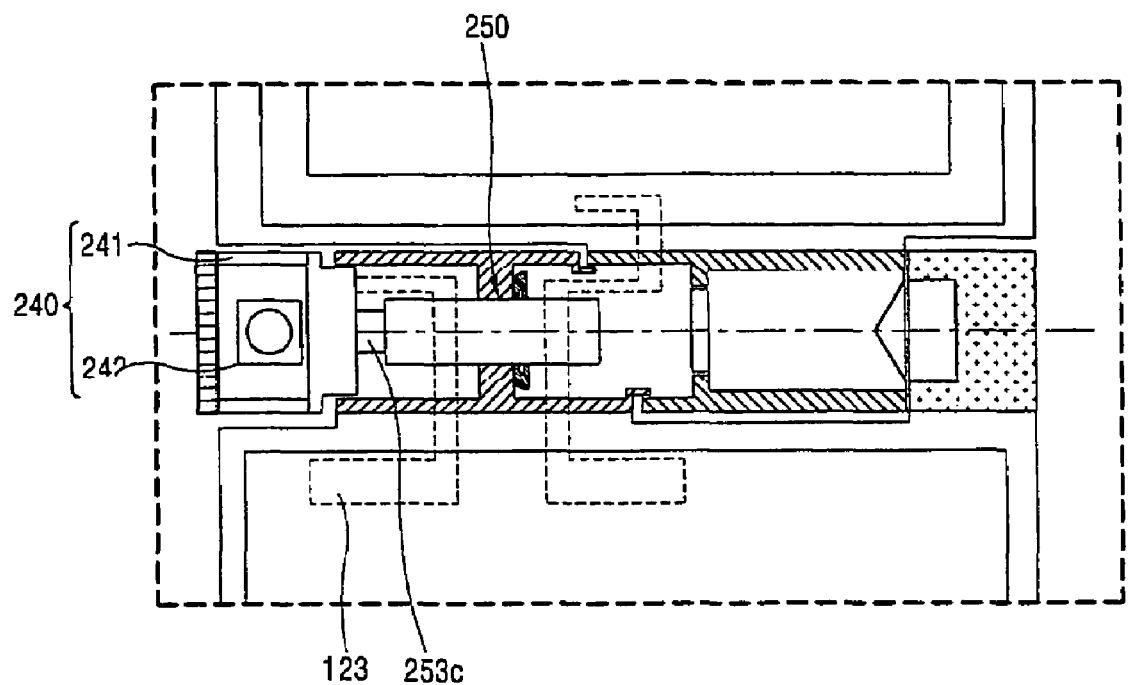
FIG. 11 is a cross-sectional view of an exemplary hinge-mounted camera assembly in accordance with another embodiment of the present invention.

FIG. 11 is an enlarged view similar to section "A" of FIG. 3. Specifically, it is a sectional view showing another example of a camera assembly of a mobile communication device in accordance with the present invention.

Figure 12:
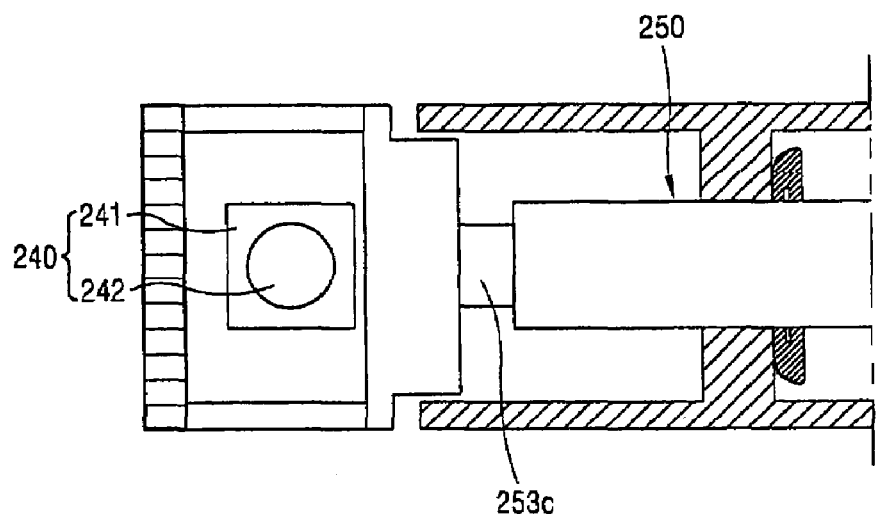
FIG. 12 is a partial perspective view of the camera assembly of FIG. 11.

As generally shown in FIGS. 11-12, FPCB 123 is directly connected to camera module 242. Deceleration rotational axle 253c of rotatable camera portion 250 is fixed to camera 240. A decelerator (not shown) within rotatable camera portion 250 is designed to have a relatively low deceleration ratio, approximately 125:1.

When the rotational angle of camera 240 is automatically controlled, deceleration rotational axle 253c of rotatable camera portion 250 rotates camera 240 within a certain angular range since deceleration rotational axle 253c is fixed to camera 240.

When the rotational angle of camera 240 is manually controlled, camera 240 is rotated toward a desired direction by the user. Herein, since the decelerator inside rotatable camera portion 250 has a very low deceleration ratio, deceleration rotational axle 253c is rotated within a certain angular range with camera 240 at the time of rotating camera 240 toward the desired direction, thereby controlling the rotational angle of camera 240.

Figure 13:
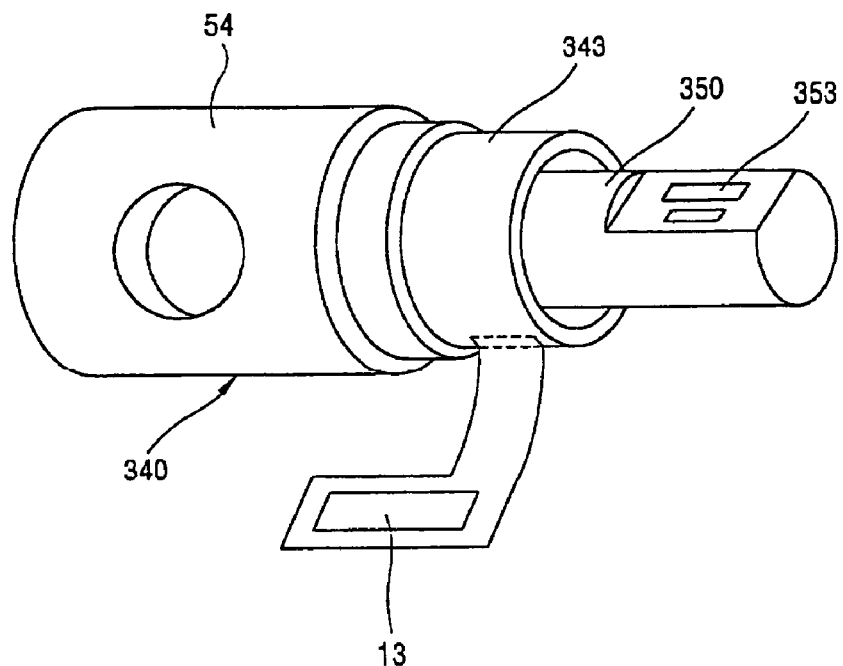
FIG. 13 is a partial perspective view of another exemplary camera assembly in accordance with the present invention.
Figure 14:
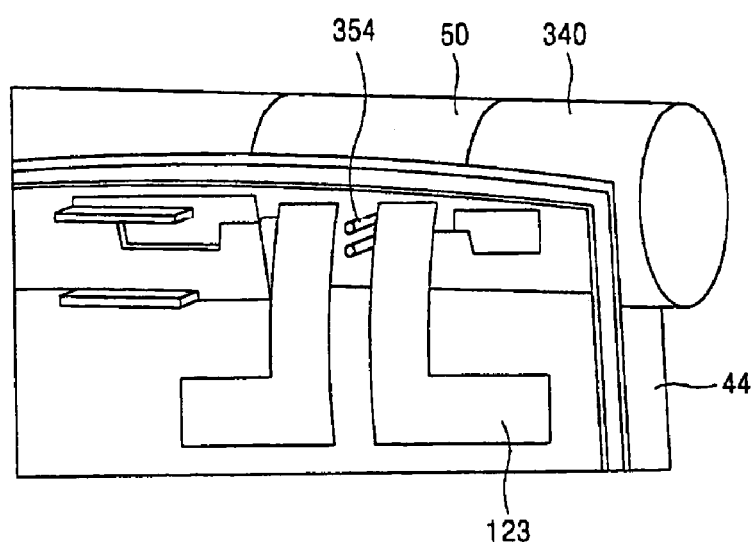
FIG. 14 is a partial perspective view of the camera assembly of FIG. 13.

FIGS. 13-14 generally illustrate yet another example of a camera assembly of a mobile communication device in accordance with the present invention. A first connection terminal 353 serving as a power supply portion is installed at rotatable camera portion 350, and a second connection terminal 354 is installed at first hinge portion 50, respectively. A camera 340 is positioned at the side of first hinge portion 50, and a FPCB accommodation portion 343 receives FPCB 313.

When camera 340 and gear motor 152 are coaxially arranged, the overall mass of the mobile communication device may become unacceptably bulky. Therefore, gear motor 152 is preferably arranged at the rear side (battery side) of the mobile communication device, as described herein below in reference to FIGS. 15-17.

Figure 15:
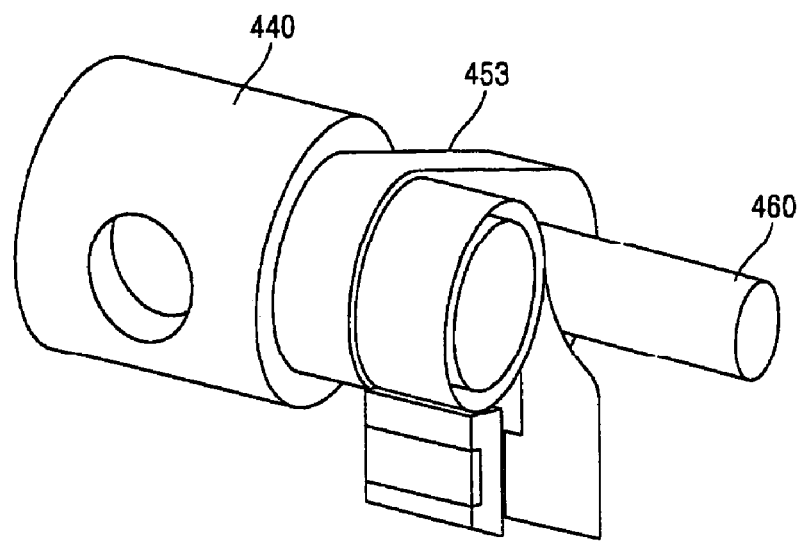
FIG. 15 is a perspective view of another exemplary decelerator for use in accordance with the present invention.
Figure 16:
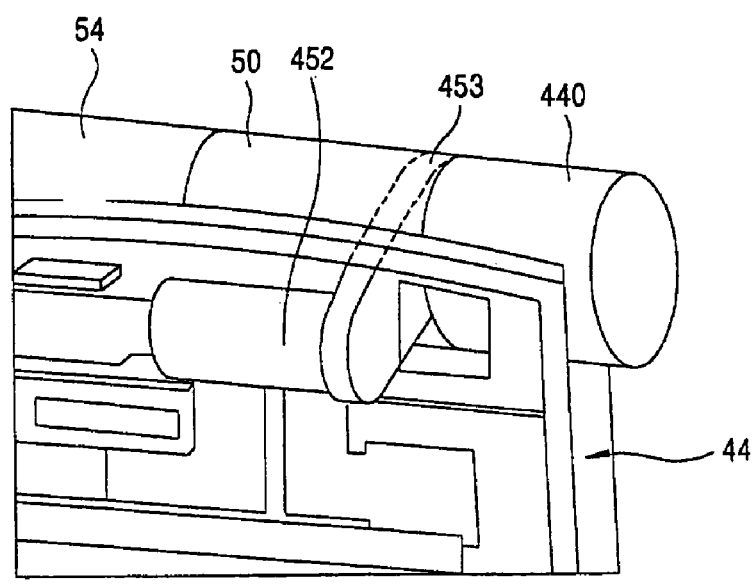
FIG. 16 is a partial perspective view of a camera assembly incorporating the decelerator of FIG. 15.
Figure 17:
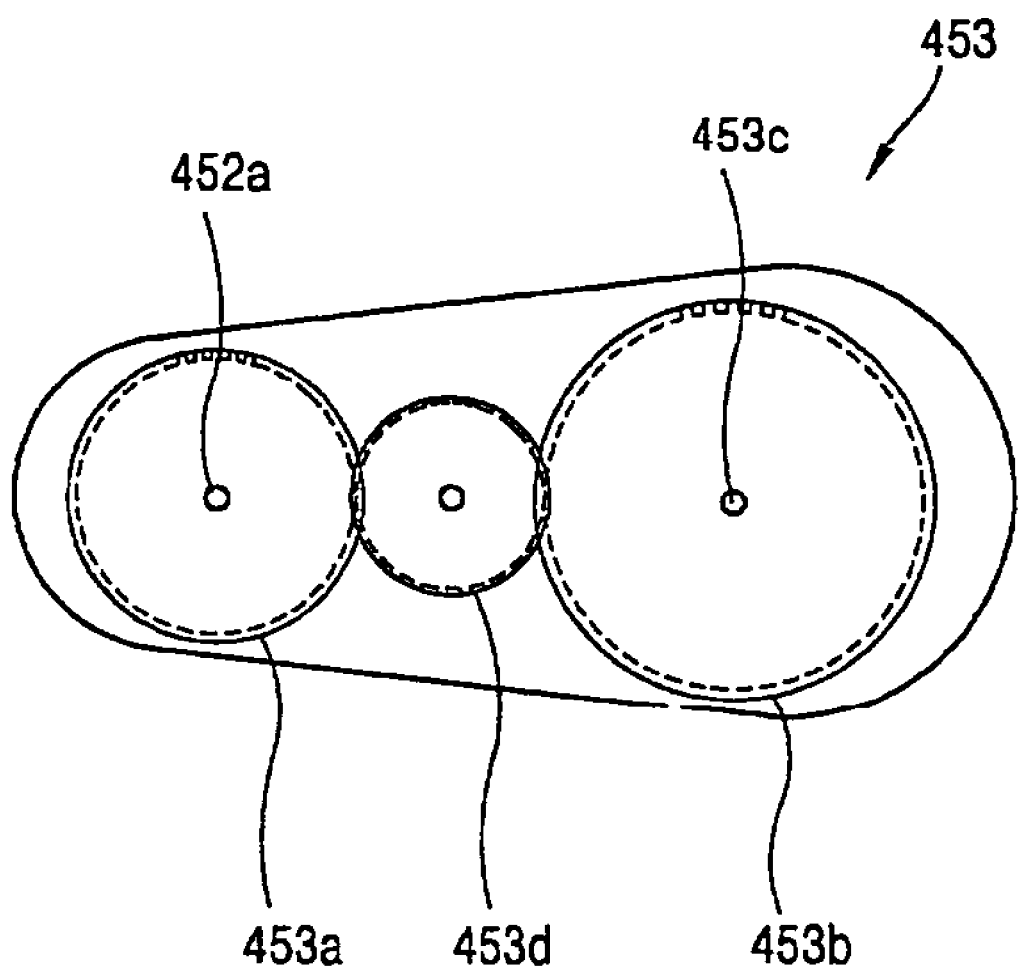
FIG. 17 is a schematic view of several components of the decelerator of FIG. 15.

FIGS. 15-17 generally illustrate still another example of a camera assembly of a mobile communication device in accordance with the present invention. A camera 440 is positioned at the side of first hinge portion 50, a gear motor 452 is positioned at the rear side (battery side) of body 44, and a decelerator 453 is operatively coupled between camera 440 and gear motor 452. As generally shown in FIG. 17, decelerator 453 comprises a drive gear 453a provided at one end of a drive motor axle 452a for decelerating the rotational force generated by drive motor 452 and transmitting the same to camera 440. Decelerator 453 also comprises a deceleration gear 453b, a deceleration rotational axle 453c, and a transmission gear 453d operatively coupled between drive gear 453a and deceleration gear 453b for transmitting power to gear motor 452.

As generally described hereinabove, the camera rotational angle may be controlled automatically or manually depending on user selection. A person skilled in the art would appreciate that a FPCB, such as, for example, FPCB 313 of FIG. 13, is prevented from being possibly damaged during rotation of the camera by being safely accommodated in a FPCB accommodation portion such as FPCB accommodation portion 343 of FIG. 13.

All terms should be interpreted in the broadest possible manner consistent with the, context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

While the present invention has been described in detail with regards to several embodiments, it should be appreciated that various modifications and variations may be made in the present invention without departing from the scope or spirit of the invention. In this regard it is important to note that practicing the invention is not limited to the applications described hereinabove.

Many other applications and/or alterations may be utilized provided that such other applications and/or alterations do not deviate from the intended purpose of the present invention. Also, features illustrated or described as part of one embodiment can be used in another embodiment to provide yet another embodiment such that the features are not limited to the embodiments described above. Thus, it is intended that the present invention cover all such embodiments and variations as long as such embodiments and variations come within the scope of the appended claims and their equivalents.

What is claimed is:

1. A mobile communication device having a camera assembly, the camera assembly comprising:
   a camera; and
   a first portion adapted to rotate said camera, said first portion comprising a housing, a gear motor mounted in said housing for generating a rotational force, and a means for decelerating said rotational force for the purpose of rotating said camera, wherein said means for decelerating includes:
   a drive gear provided at a camera motor axle and adapted to decelerate said rotational force generated from said gear motor;
   a deceleration gear operatively coupled to said drive gear and deceleration-rotated with a certain ratio;
   a deceleration rotational axle for transmitting said decelerated rotational force; and
   a transmission gear operatively coupled between said drive gear and said deceleration gear,
   wherein a frictional plate is positioned between the camera and the deceleration rotational axle, the frictional plate transmitting driving force to the camera when the deceleration rotational axle is driven by the gear motor and stopping without rotation against a manual rotation of the camera when the gear motor is in a power-off state.

2. The mobile communication device of claim 1, wherein said gear motor and said decelerating means are coaxially arranged.

3. The mobile communication device of claim 1, wherein a first connection terminal is installed at said gear motor, and a second connection terminal is coupled to at least one of a plurality of body side hinge portions relative to said first connection terminal.

4. The mobile communication device of claim 3, wherein said frictional plate is coupled to said deceleration rotational axle.

5. The mobile communication device of claim 4, wherein said frictional plate is provided with a plurality of stepped protrusions, and said camera is provided with a plurality of grooves adapted to mate with said plurality of stepped protrusions.

6. The mobile communication device of claim 5, wherein said stepped protrusions and said mating grooves are respectively hemispherically shaped.

7. The mobile communication device of claim 3, wherein said first portion is inserted into a hinge groove formed inside said plurality of body side hinge portions and is fixed by a fixation ring.

8. The mobile communication device of claim 1, further comprising means for controlling the rotation of said camera.

9. The mobile communication device of claim 8, wherein a flexible printed circuit board (FPCB) accommodation portion is formed at one side of said camera.

10. The mobile communication device of claim 8, wherein means for controlling the rotation is selected via a keypad.

11. The mobile communication device of claim 8, wherein the rotation of said camera is automatically controlled by supplying power to the gear motor.

12. The mobile communication device of claim 8, wherein the rotation of said camera is manually controlled by turning off the gear motor.

13. The mobile communication device of claim 1, wherein said transmission gear is mounted on a bracket and rotates via an axle.

14. The mobile communication device of claim 1, wherein said rotational force generated by the gear motor is transmitted sequentially through said drive gear, transmission gear, and deceleration gear.

15. The mobile communication device of claim 1, wherein said rotational force is outputted via said deceleration rotational axle.

16. The mobile communication device of claim 1 wherein the deceleration gear has teeth on an inner circumferential surface and the transmission gear is adapted to mesh with the drive gear at an inner area of the deceleration gear.

* * * * *